455-613 AU 233 EX
FIP3106 XR 3,351,410
x 5010 D
②

Nov. 7, 1967 A. ASHKIN 3,351,410

COUPLED JUNCTION SEMICONDUCTOR DEVICES FOR OPTICAL WAVELENGTHS

Filed Dec. 5, 1963 2 Sheets-Sheet 1

INVENTOR
A. ASHKIN
BY David P. Kelley
ATTORNEY

3351410
OR IN 350/161R

Nov. 7, 1967 A. ASHKIN 3,351,410

COUPLED JUNCTION SEMICONDUCTOR DEVICES FOR OPTICAL WAVELENGTHS

Filed Dec. 5, 1963 2 Sheets-Sheet 2

United States Patent Office 3,351,410
Patented Nov. 7, 1967

3,351,410
COUPLED JUNCTION SEMICONDUCTOR DEVICES FOR OPTICAL WAVELENGTHS

Arthur Ashkin, Bernardsville, N.J., assignor to Bell Telephone Laboratories, Incorporated, New York, N.Y., a corporation of New York Filed Dec. 5, 1963, Ser. No. 328,227
4 Claims. (Cl. 350—161)

ABSTRACT OF THE DISCLOSURE

When p-n-p junction devices are operated with both junctions in reverse bias, light coupling between the junctions can be varied to produce switching, power dividing, and amplitude modulation. An array of such devices, properly aligned, produces controlled impingement of light beams on a plurality of target addresses either singly or simultaneously.

This invention relates to light translating and modulating devices, and, more particularly, to semiconductor junction type devices for translating or modulating light.

The invention of the optical maser, which generates coherent light waves, has greatly expanded the bandwidth available for communication purposes, for example. In addition, it has made available high intensity coherent light beams which are useful in a wide range of applications. The great potential of the optical maser has not been fully realized as yet, however, because of the lack of the necessary circuit and systems components capable of operating at the high frequencies involved. Among such components are directional couplers, power dividers, switches and modulators which cannot be made from simply scaling down their microwave counterparts. Although some of these components have been developed, in most cases they are quite complex, or they require costly materials, or they are not completely reliable in operation.

It is an object of the present invention to produce switching, power dividing, or modulating of coherent light beams in a simple, reliable structure utilizing readily available materials.

In a copending U. S. patent application of A. Ashkin and M. Gershenzon, Ser. No. 265,511, filed Mar. 15, 1963, now U.S. Patent No. 3,295,911 it is pointed out that one characteristic of a p-n junction device of material such as gallium-arsenide (GaAs) is that the junction and its depletion layer act as a dielectric waveguide, trapping a major portion of any light traveling along the junction within the junction itself. In another copending U. S. patent application of A. Ashkin, Ser. No. 287,957, filed June 14, 1963, it is shown that for a p-n-p junction device, of material such as gallium-arsenide, where one of the junctions is forward biased to produce light, and the other junction is reverse biased, it is possible to establish a coupling between the two junctions which can be varied by varying the reverse bias on the one junction, and thereby effect a tuning of the forward-biased junction.

The present invention makes use of both of these phenomena to produce a variety of functions, as enumerated in the foregoing, namely, switching, power dividing, and modulation of coherent light beams.

In a first illustrative embodiment of the invention, a semiconductor member has first and second regions of material of one conductivity type, such as, for example, p-type separated by a thin layer of material of opposite conductivity type, for example, n-type. As a consequence, there are two p-n junctions formed in the member that are parallel and co-extensive. Each of the junctions are reverse biased by variable voltage sources which may be signal or control voltages from a previous stage of the system in which the member is used. Input means are provided for focusing a beam of light onto either one or both of the junctions for travel along the length of the junction. At the other end of the junctions are focusing means for directing the light emerging from the junctions into either one or both of a pair of p-n-p junction members substantially identical to the first member. When a beam of light is directed into one of the junctions of the first member, the light power will be directed through the junction due to the dielectric waveguide effect and emerge substantially unchanged at the other end, when no coupling exists between the junctions. On the other hand, when coupling does exist between the junctions, a portion or all of the light power will be transferred to the second junction, depending on the degree of coupling which, in turn, depends upon the amount of reverse bias on the junctions.

The light power emergent from one of the junctions is directed into one of the junctions of one member of the pair of p-n-p members, while the light power emergent from the other junction is directed into one of the junctions of the other member of the pair of p-n-p members. Control of the bias on these junctions produces outputs from any desired ones of the junctions.

In a second illustrative embodiment of the present invention, a p-n-p junction semiconductor member has applied thereto a light beam to be modulated, directed into one of the junctions, and a modulating signal applied across the junctions in the reverse direction. As a consequence, the light output of the junction into which the beam is directed varies as the coupling between junctions varies, i.e., in accordance with the modulating voltage. The light output, an amplitude modulated light beam, is then directed to suitable utilization means.

It is a feature of the present invention that a p-n-p junction device is provided with variable reverse-biasing means on both junctions for varying the amount of light transmitted by the junctions.

It is another feature of the present invention that in a cascade array of p-n-p junction devices, a light beam directed into one junction of the first device in the array is directed to any one or number of addresses at the output of the array.

These and other objects and features of the present invention will be more readily apparent from the following detailed description taken in conjunction with the accompanying drawings, in which.

Figures 1, 2:
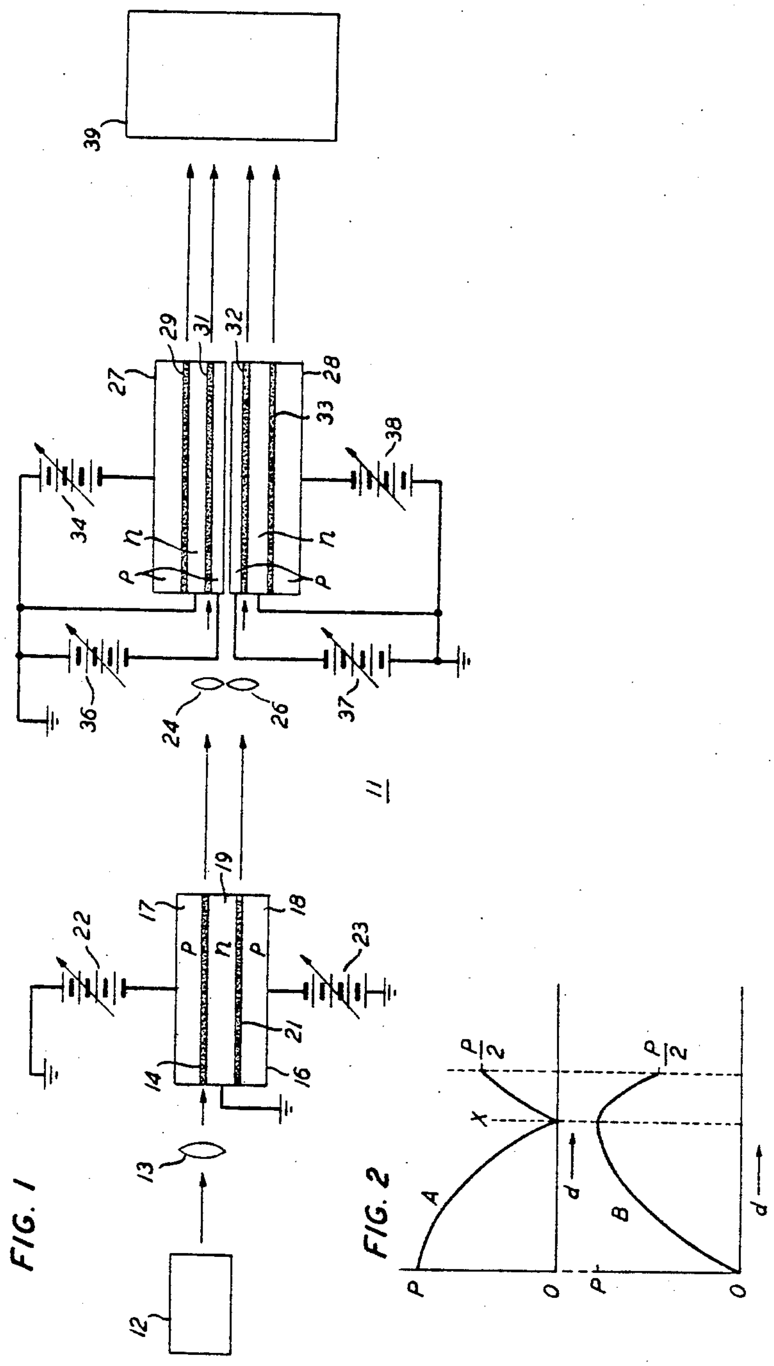
FIG. 1 is a diagrammatic view of a first illustrative embodiment of the invention.
FIG. 2 is a graph showing the power transfer characteristics between coupled junctions.

Turning now to FIG. 1, there is depicted a first illustrative embodiment of the present invention wherein the principles of the invention are utilized to supply light to any number of a multiplicity of channels. The system 11 of FIG. 1 comprises a source 12 of a beam of light, which may be, for example, an optical maser of any one of a number of types well known in the art. The light from source 12 is directed, as indicated by the arrow, through a focusing lens 13 into a junction 14 of a p-n junction device 16 having first and second layers 17 and 18 of p-type conductivity material separated by a thin layer 19 of an n-type material, thereby forming a pair of parallel and co-extensive junctions 14 and 21. Both junctions 14 and 21 reverse biased by adjustable biasing means 22 and 23, shown here as batteries but which, as will be more apparent hereinafter, may take any one of a number of forms, which are connected respectively to layers 17 and 18. Layer 19 is connected to ground.

Beyond device 16 are located a pair of focusing lenses 24, 26, which are axially aligned with junctions 14 and 21, respectively. While a pair of focusing lenses have been shown, a single large lens may be used provided it focuses light emerging from both the junctions 14 and 21. Beyond lenses 24 and 26 are a pair of p-n-p junction devices 27 and 28, having p-n junctions 29, 31 and 32, 33, respectively. As shown in FIG. 1, junction 31 is axialy aligned with lens 24 and junction 14 of device 16, while junction 32 is axially aligned with lens 26 and junction 21 of device 16. As with device 16, the junctions 29, 31 and 32, 33 are formed by a pair of layers of p-type material separated by a thin layer of n-type material in each of devices 27 and 28. The devices 14, 27, and 28 may be made from any of a number of suitable materials, such as, for example, gallium-arsenide or gallium-phosphide.

Junctions 29 and 31 are reverse-biased by means of variable biasing sources 34 and 36, shown here as batteries but which may take other forms as well, having their positive terminals connected to the p-type layers of device 27 and their negative terminals to the n-type layer. In like manner, junctions 32 and 33 are reverse biased by a pair 37, 38 of variable voltage sources, also shown here as batteries. Beyond devices 27 and 28 is a utilization device 39 which, as will be more apparent hereinafter, may take any one of a number of forms, depending upon the particular use to which the arrangement 11 is to be put.

For a better understanding of the operation of the arrangement of FIG. 1, reference should be made to FIG. 2, which depicts the distribution of light power P from source 12 between the junctions 14 and 21, along the length of the junctions. As is pointed out in the aforementioned copending applications of Ashkin-Gershenzon and Ashkin, the depletion layer of a p-n junction for a material, such as gallium-phosphide or gallium-arsenide, has a thickness comparable to a wavelength of light, and also has a significantly different index of refraction from the remaining semiconductor material. As a consequence, light directed into the junction is trapped therein and propagates along the junction, the junction and depletion layer acting as a dielectric waveguide. In addition, as in the case of dielectric waveguides, when a second dielectric waveguide is placed within sufficiently close proximity to the first waveguide that the electromagnetic fields propagating in one guide impinge upon the other guide, there is coupling between the two guides and an energy interchange therebetween. This phenomenon is represented in FIG. 2 with regard to the device 16 of FIG. 1.

Where light is directed into junction 14, it propagates therealong and emerges at the other end. However, by proper adjustment of the biasing sources 22 and 23, the depletion layer of junction 14 can be made sufficiently thin so that most of the propagating field is outside of the junction and is coupled into junction 21. As a consequence, power from junction 14, as indicated by curve A in FIG. 2, commences to be transferred to junction 21 until, at a point X along the junctions, all of the power P, as indicated by curve B in FIG. 2, is in junction 21 and none in 14. The power transfer process then reverses itself and junction 21 gives up power to junction 14. By proper choice of the biasing voltages, junction lengths, and thickness of the n-type layer, it is possible to transfer any amount of power from one junction to the other. In FIG. 2, there is depicted an equal power division, i.e., for a power P entering junction 14, a power P/2 emerges from each of junctions 14 and 21. As explained in the foregoing, any percent power division is obtainable with the arrangement, equal power division being shown for illustrative purposes only.

The light emerging from junctions 14 and 21 is directed through buses 24 and 26 and focused on junctions 31 and 32 of devices 27 and 28, respectively. As with device 16, devices 27 and 28 can be biased in such a manner that any desired amount of power transfer takes place between junctions 29 and 31 and junctions 32 and 33. In the arrangement 11 of FIG. 1, the light entering junction 31 is divided equally between junctions 29 and 31, and the light entering junction 32 is divided equally between junctions 32 and 33, so that there emerges from devices 27 and 28 four light beams each having a power of P/4 for an original light input to the system of a power P. These emergent light beams are directed to a utilization device 39 which could comprise another stage of power division or take some other form.

It is obvious from the foregoing that the arrangement of FIG. 1 can be used in a variety of ways. Thus, where it is desired to direct light to any one or group of addresses, as in a memory, switching or scanning arrangement, the light from source 12 can be directed thus, under proper bias conditions. The various biasing sources, 22, 23, 34, 36 and 37, 38, in such a case, might be scanning or reading signals and device 39 a bank of storage elements or photodetectors, for example. In an array of elements arranged in groups, as in FIG. 1, it is apparent that for N number of p-n-p devices in the final stage, there will be 2N possible addresses for the emergent light.

Figure 3:
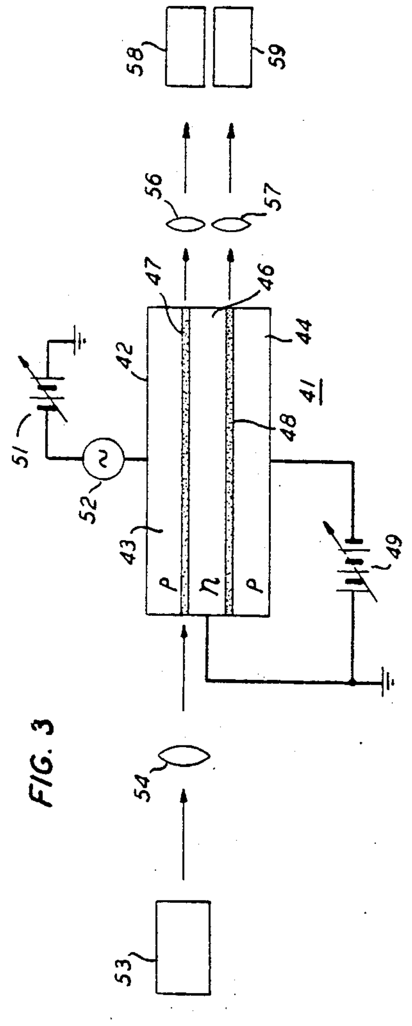
FIG. 3 is a diagrammatic view of a second illustrative embodiment of the invention.

Thus far, the principles of the present invention have been illustrated in a power dividing, switching or scanning arrangement. These same principles are readily applicable to amplitude modulation of light also. In FIG. 3, there is depicted schematically such an amplitude modulating arrangement 41. Arrangement 41 comprises a p-n-p junction device 42 having a pair of p-type regions 43 and 44 separated by a thin n-type region 46, thereby forming a pair of p-n junctions 47, 48 that are parallel and coextensive. As with the devices of FIG. 1, device 42 may be made of any suitable material such as, for example, gallium-phosphide or gallium-arsenide.

Junction 48 is reverse biased by a source 49 of variable bias voltage connected to regions 44 and 46, as shown. In the present embodiment, source 49 is not absolutely necessary for proper operation; in its absence region 44 may be connected to ground. However, source 49 produces a control over the width and characteristics of junction 48 that greatly enhances the flexibility and preciseness of operation of the arrangement 41. Junction 47 is reverse biased by a variable voltage source 51 connected to region 43 as shown. Also connected to region 43 is a source 52 of modulating voltage.

Figures 4A, 4B:
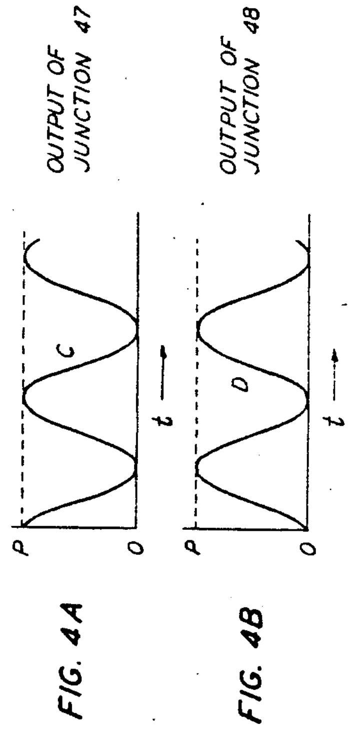
FIG. 4 is a graphical depiction of the power output characteristics of the arrangement of FIG. 3.

In operation a source 53 of light to be modulated directs a beam of light through a focusing lens 54 into junction 47. Source 53 may be any one of a number of well-known types of optical maser, preferably one that produces a continuous beam of coherent light. Bias voltage sources 51 and 49 are adjusted so that, for one hundred percent modulation, the maximum voltage swings of the modulating voltage produce either zero power transfer or complete power transfer between junctions 47 and 48. This condition is depicted in FIG. 4 by curves C and D. In FIG. 4, it can be seen that for an input power P from source 53 to junction 47, the output of junction 47, as shown by curve C varies between zero power and P at the modulating frequency. At the same time, the output power of junction 48, as shown by curve D, varies between zero power and P at the modulation frequency, but is shifted 180° in phase relative to the output of junction 47. It can be seen from FIG. 4 that the light beams having a power P from source 53 undergo one hundred percent modulation in the device 42. which produces two usable modulation light outputs. Obviously, by adjustment of the bias voltages, modulation at other than one hundred percent can readily be obtained. The outputs of junctions 47 and 48 are directed through focusing lenses 56 and 57 to utilization devices 58 and 59, which may be light amplifiers, detectors, or other devices for utilizing the modulated light.

It is also possible to utilize an internal form of modulation which requires less modulating power than the arrangement of FIG. 3. In the internal form of modulation, no external source of light is used, one of the junctions of a p-n-p device being biased to produce laser action and its output controlled by the modulating voltage varying the coupling.

From the foregoing, it is readily apparent that the principles of the invention are readily applicable to such devices and arrangements as light power dividers, scanners, switches, and modulators, while p-n-p type devices have been depicted, it is obvious that n-p-n type devices might also be used, with proper voltages. Other types of arrangements utilizing the principles of the present invention may readily occur to workers in the art without departure from the spirit and scope of the invention.

What is claimed is:

1. In combination, a plurality of semiconductor members, each member having first and second regions of material of one conductivity type separated by a third region of opposite conductivity type forming a pair of p-n junctions that are substantially parallel and co-extensive, said third region being sufficiently thin to permit transfer of optical energy between the two junctions, said members being arranged in an array of groups, each of the members of each group having one of its junctions axially aligned with one of the junctions of a member of the preceding stage in the array, means for directing optical energy longitudinally along at least one of the junctions in a member in the first stage of the array, and means for controlling the optical energy output from the last stage of the array comprising means for applying voltages in the reverse direction across each of the junctions of all of the members in the array, at least one of said last-mentioned means in each stage of the array being variable.

2. The combination, as claimed in claim 1, wherein the first stage of the array has a single semiconductor member and each of the remaining stages of the array has twice as many members as the stage immediately preceding it.

3. The combination, as claimed in claim 1, wherein a variable reverse voltage is applied across each of the junctions of all of the members of the array.

4. A light directing system for directing light to one or more addresses simultaneously and for controlling the amount of light delivered to each address comprising a plurality of groups of semiconductor members arranged in an array, each of said members having first and second regions of material of one conductivity type separated by a region of different conductivity type forming a pair of substantially parallel junctions through which light can be directed, each member of each group in the array having one junction aligned with a junction of a member in the immediately preceding group in the array, and means for controlling the degree of coupling between the junctions of at least one member of each group in the array.

References Cited

UNITED STATES PATENTS

| | | | |
|---|---|---|---|
| 3,208,342 | 9/1965 | Nethercot | 88—61 |
| 3,220,013 | 11/1965 | Harris | 88—61 |

OTHER REFERENCES

Ashkin et al.: "Reflection and Guidings," J. Appl. Phys., vol. 34, No. 7, July 1963, pp. 2116–2119.

Yariv et al.: "Dielectric Waveguide" App. Phy. Letters, vol. 2, No. 3, Feb. 1, 1963, pp. 55–57.

Schmidt: "The Problem of Light Beam Deflection," Optical Processing of Information (MIT Press) Oct. 1962, pp. 98–103.

JEWELL H. PEDERSEN, *Primary Examiner.*

E. S. BAUER, *Assistant Examiner.*